United States Patent [19]

Saito et al.

[11] Patent Number: 4,571,822
[45] Date of Patent: Feb. 25, 1986

[54] APPARATUS FOR INSERTING COILS INTO STATOR CORE SLOTS

[75] Inventors: Hiroshi Saito; Hiromasa Okayasu; Shinichi Tsuyuki; Takeshi Kawana, all of Yokohama; Takao Mifune, Ichikawa; Masanori Yoshizaki, Yachiyo, all of Japan

[73] Assignee: Hitachi, Ltd., Tokyo, Japan

[21] Appl. No.: 557,005

[22] Filed: Dec. 1, 1983

[30] Foreign Application Priority Data

Dec. 1, 1982 [JP] Japan ................................ 57-209384

[51] Int. Cl.⁴ .......................................... H02K 15/06
[52] U.S. Cl. ........................................ 29/736; 29/596
[58] Field of Search ................. 29/734, 732, 736, 596, 29/606

[56] References Cited

U.S. PATENT DOCUMENTS

| | | | |
|---|---|---|---|
| 2,873,514 | 2/1959 | Mills | 29/732 |
| 4,051,595 | 10/1977 | Bule | 29/736 X |
| 4,106,189 | 8/1978 | Peters | 29/736 |

Primary Examiner—Carl E. Hall
Attorney, Agent, or Firm—Antonelli, Terry & Wands

[57] ABSTRACT

A method of and apparatus for inserting coils into slots formed in the stator core of a dynamoelectric machine such as an electric motor, with the stator core having open type slots each of which cooperates with blades of the apparatus for guiding the coil and a stripper for forcing the coil out of the blades. A closed space has a volume sufficient to avoid any disorder of coil wire layers when the coil is received by the closed space. After placing the coils in the closed spaces, the coils are pushed into the respective slots and, as desired, the coils are further compressed until the coil wires assume a non-circular cross-section. By so doing, it is possible to remarkably increase the space factor of each slot.

1 Claim, 8 Drawing Figures

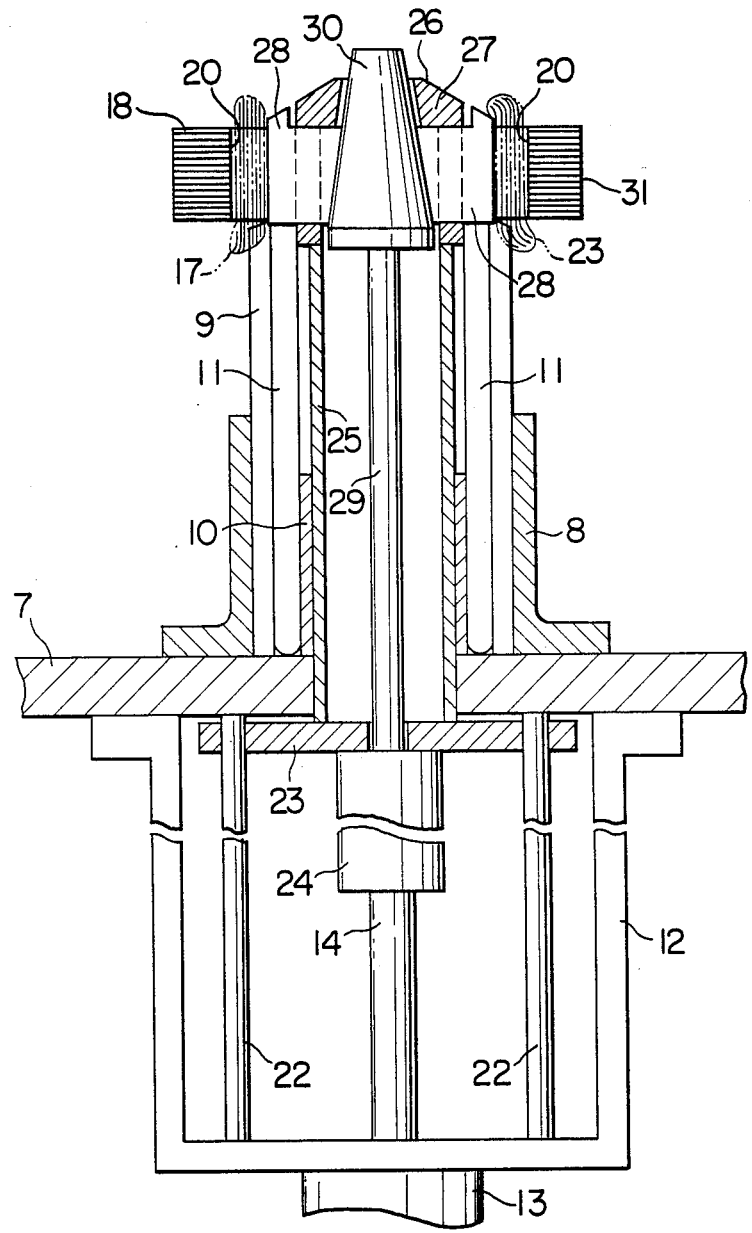

APPARATUS FOR INSERTING COILS INTO STATOR CORE SLOTS

BACKGROUND OF THE INVENTION

The present invention relates to a method of and apparatus for inserting coils into slots formed in the stator core of a dynamoelectric machine and more particularly, to a method of and apparatus for inserting coils into the slots in the stator core of a small-sized dynamoelectric machine such as, for example an electric motor.

In a dynamoelectric machine such as an electric motor, the space factor of the slots in the stator or armature, i.e. the ratio of the sum of the cross-sectional areas of the coil wires received by the slots to the cross-sectional area of the slots, is a very significant factor which affects the performance, e.g. the ratio of the output energy to the input energy, as well as the size of the machine.

For instance, in a large-size electric motor operating with large high voltage electric current such as a current for driving an electric car, it is necessary to employ coil wires having a large diameter and to ensure insulation between adjacent coil wires. In the production of a large-size motor, therefore, the wires are pre-shaped to have the desired cross-section are subjected to an insulating treatment. The pre-treated wires are then put into each slot in the stator core in a one-by-one fashion. To this end, each slot in the stator core is an open type slot having a substantially constant circumferential width over entire radial length thereof. The assembling of such a large-size electric motor, therefore, requires considerable manual labor resulting in a low production efficiency, although a high space factor on the order of 70 to 80% is achieved.

On the other hand, small-sized electric motors such as industrial general purpose motors, operating with comparatively small low voltage electric current, are designed and produced making much of the productivity.

Generally, a small-sized electric motor having a space factor of about 60% exhibits an efficiency generally ranging between 60% and 70%, although more strictly the efficiency depends on the type of the motor. It is also known that about 10% increase of the efficiency is attained by an increase of the space factor to 90%.

However, there has been no effective measures for increasing the space factor so that the users have been obliged to use electric motors having rather low efficiency.

Accordingly, an object of the invention is to provide method of and apparatus for inserting coils, which provides a large value of the space factor in the stator without a reduction in the production efficiency, thereby overcoming the problems of the prior art.

Another object of the invention is to provide method of and apparatus for inserting coils, which enables a reduction in the size of the motor thereby contributing to the saving of natural resources.

To these ends, according to the invention, a method of inserting coils is proposed wherein the coils have a coil wire wound regularly in wire layers automatically inserted into slots in the stator core of a dynamoelectric machine by a coil inserting apparatus, with the method including supplying the coils into the spaces formed between respective adjacent blades of the inserting apparatus, pushing up, by a stripper of the apparatus, the portions of the coils located in an area inside the blades until the coil portions are moved out of an area beyond the ends of the blades so as to insert the coils into closed spaces defined by the walls of the respective slots, blades of the apparatus and the stripper. The coils are forced in the closed spaces into the slots in the stator core, and the coils, received by the slots, are compressed as desired until each coil wire assumes a non-circular cross-section.

According to another feature of the invention, an apparatus for inserting coils into slots in a stator core of a dynamoelectric machine is proposed which includes a plurality of blades disposed along a circle at a predetermined circumferential pitch so as to oppose the ends of the partition walls separating adjacent slots from each other, with a plurality of projections being provided which are capable of projecting into the spaces formed between respective adjacent blades. A stripper is disposed at the center of the circle of the blades and is adapted to push up the coils supported by the blades into corresponding slots of the core fitting around the upper ends of the blades. At least the portions of the projections opposed to the slots in the stator core when the stripper is in the end of its upward stroke, are constituted by pushers which are disposed radially around the stripper for sliding movement in the radial direction. The coil inserting apparatus includes a conical or pyramidal cam disposed at the center of the stripper and contacting one end of the pushers, with a means being provided for moving the cam up and down.

These and other objects, features and advantages of the invention will become more apparent from the following description of the preferred embodiments taken in conjunction with the accompanying drawings.

BRIEF DESCRIPTION OF THE DRAWINGS

FIG. 7 is a cross-sectional front elevational view of the coil inserting apparatus in the state after the completion of insertion of the coils.

DETAILED DESCRIPTION

Preferred embodiments of the invention will be described hereinunder with reference to the accompanying drawings.

Figure 1:
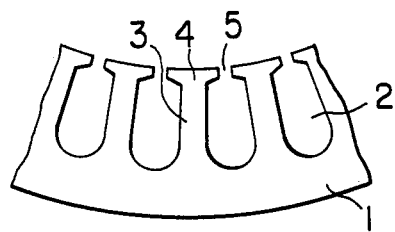
FIG. 1 is a plan view of a portion of the stator core incorporated in a prior art small-sized electric motor.
Figure 2:
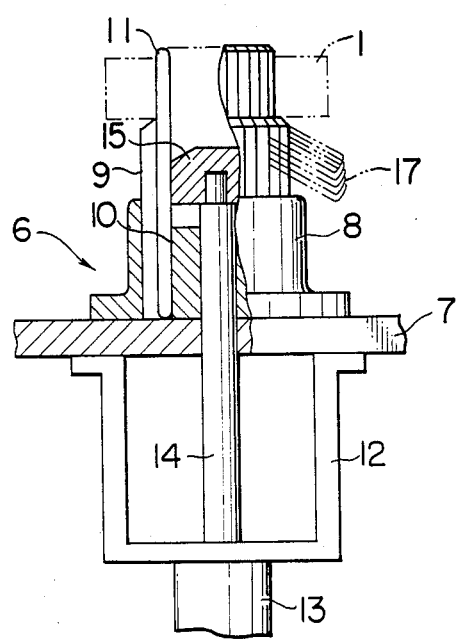
FIG. 2 is a partial cross-sectional front elevational view of a prior art coil inserting machine.
Figure 3:
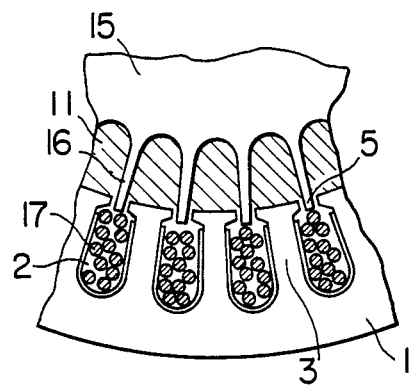
FIG. 3 is an enlarged plan view of a portion of the machine shown in FIG. 2 in a state of operation for inserting coils.

Referring now to the drawings wherein like reference numerals are used throughout the various views to designate like parts and, more particularly, to FIG. 1, according to this figure, a small sized electric motor is provided with semi-closed slots in a stator core, with the slots including an open end 5 in the stator core 1 which is partially closed by radial ends 4 of adjacent teeth 3 the insertion of the coils into the slots 2 is automatically carried out by a coil inserting machine generally designated by the reference numeral 6 such as, for example, of the type illustrated in FIGS. 2 and 3.

More particularly, as shown in FIGS. 2 and 3, the coil insertion machine 6 has a holder 8 fixed to the base 7, with a plurality of wedge-shaped guides 9 being fixed to the holder 8 along a circle at a constant circumferential pitch. An inner surface of each wedge-shaped guide 9 supports a blade 11, with the blades 11 being located by an inner guide 10 which is disposed at a center of the holder 8. A hydraulic cylinder 13 is supported by the lower face of the base 7 through a bracket 12, with the cylinder 13 including a cooperating rod 14, the upper end of which carries a stripper 15 located above the inner guide 10 at a center of the circle of the blades 11. The stripper 15 has projections 16 projecting into the spaces between adjacent blades 11.

For inserting the coils 17 into the slots 2, the coils 17 are first positioned in the spaces between adjacent blades 11 and then the stator core 1 is fitted around the upper ends of the blades 11. In this state, the cylinder 13 operates to lift the stripper 15, so that the stripper pushes up the coils 17 received by the spaces between adjacent blades 11 to insert the same into the slots 2.

By employing the coil inserting machine 6 of FIG. 2, it is possible to simultaneously mount the required number of coils in the stator core 1 so as to attain a high productivity. A disadvantage of this proposed arrangement resides in the fact that the coils 17, inserted into the slots 2 through the openings of the slots 2, are relieved from stresses which have been incurred during winding and insertion, so that the wires of the coils 17 in each slot 2 are free to take an irregular position. Consequently, the space factor of each slot is unfavorably decreased in the order of 60% to 67%. If the coil 17 is forcibly compacted to increase the space factor, the irregularly arranged and lapping coil wires are partially collapsed or damaged often resulting in serious problems such as, for example, an insulation failure, cutting of the conductor, an increase in resistance, and so forth.

Figure 4:
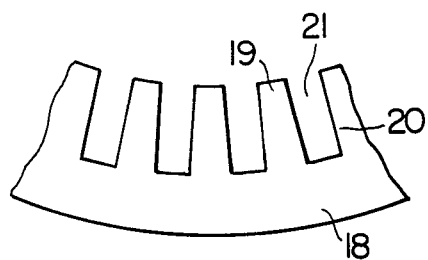
FIG. 4 is a plan view of a portion of a stator core to which the invention is applied.
Figure 5:
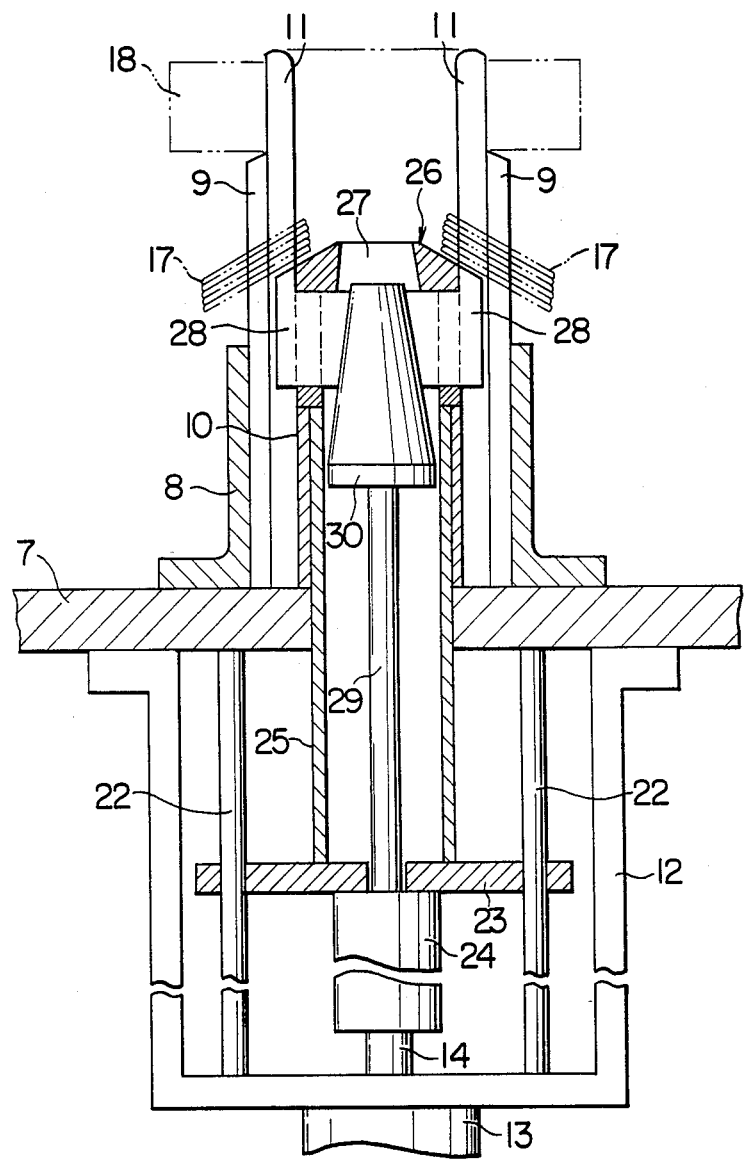
FIG. 5 is a cross-sectional front elevational view of an embodiment of a coil inserting apparatus in accordance with the invention.
Figure 6:
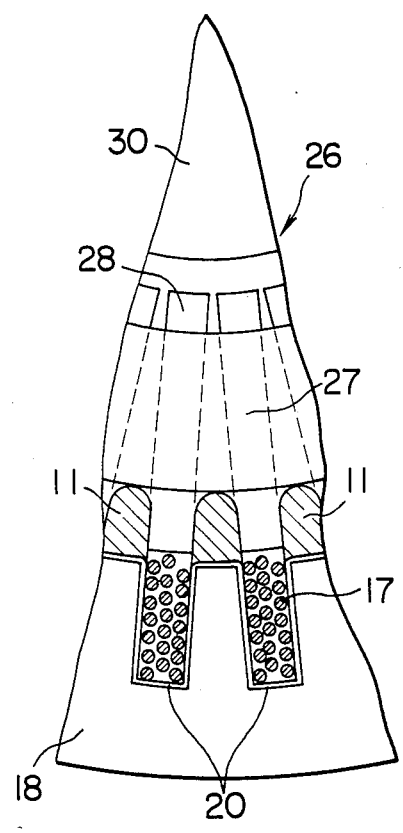
FIG. 6 is an enlarged plan view of part showing the process for inserting coils.

In accordance with the present invention, as shown in FIG. 4, a stator core 18 has a plurality of substantially trapezoidal teeth 19 projected towards the center thereof, such that substantially rectangular slots 20 are formed between adjacent teeth 19, with an opening 21 of each slot 20 having substantially the same circumferential width as the bottom of the same slot 20. The ends of the teeth 19 of the stator core 18 may be cut to fit the outer surfaces of blades of a coil inserting apparatus of the invention which will be explained more fully hereinbelow.

A coil inserting apparatus in accordance with the invention, as shown in FIGS. 5–8, includes a bracket 12 fixed to the lower side of the base 7. A pair of guide bars 22, spaced by a suitable distance from each other are disposed between the base 7 and the bracket 12, with a movable plate 23 slidably engaging the guide bars 22. A hydraulic cylinder 24 is fixed to the lower side of the movable plate 23, with a rod 14 of a cylinder 13 being connected to the lower end of the cylinder 24. A hollow shaft 25, slidably received by bores formed in the base 7 and an inner guide 10, are fixed to the upper side of the movable plate 23. A stripper 26 is supported by the upper end of the shaft 25, with the stripper 26 including a main body 27 disposed at the inner side of the blades 11, and a plurality of pushers 28 each of which being so shaped and sized so as to be slidingly engageable in the spaces between adjacent blades 11 and also by the slot 20 in the stator core 18. The pushers 28 are mounted on the main body 27 so as to be radially slidable along the main body 27. Although not shown, grooves are formed in the upper and lower surfaces of the pushers 28, as well as corresponding portions of the main body 27. Annular rubber or spring members are received by these grooves so as to bias the pushers 28 towards the center of the main body 27. A rod 29 of the cylinder 24 is disposed at the center of the shaft 25. A frusto-conical or pyramidal cam 30 is fixed to the upper end of the rod 29, with a conical surface of the cam 30 slidably contacting the radially inner surfaces of the pushers 28 so that the pushers are urged radially outwardly, i.e. from the position adjacent to the main body 27 towards the stator core 18, as the cam 30 is moved upwardly.

In operation, the required number of coils 17, are placed in the spaces between respective adjacent blades 11 in such a manner so as to avoid any disorder of the layers of the wound wire. Then, the stator core 18 is fitted to the outside of the upper ends of the blades 11. The cylinder 13 operates in this state to push up the stripper 26 which, in turn, pushes up the coils 17 received by the spaces between adjacent blades 11. Consequently, the coils 17 move together with the stripper 26 and are driven toward the slots 20 in the stator core 18.

Then, the stripper 26 is projected from the upper end of the blade 11 by a further operation of the cylinder 13 to force the portions of the coils 17 located in an area inside the blades 11, thereby moving the latter coil portions out from the latter area beyond the upper ends of the blades 11. In this state, the coils 17 are received by closed spaces which are defined by the walls of respective slots 20 in the stator core, blades 11 and the pushers 28. The space factor of the closed space, i.e. the ratio of the volume occupied by the coil to the volume of the closed space, is selected so as not to allow the coil 17 to move freely due to the stresses generated in the coil wire. For example, the size of the cross-section of the space is so selected that when the coil wire is wound in wire layers in close contact with one another from the bottom towards the opening of the slot 20, the gap formed between the pusher 28 and the uppermost wire layer is smaller than the diameter of the coil wire, preferably less than a half of the wire diameter.

Figure 8:
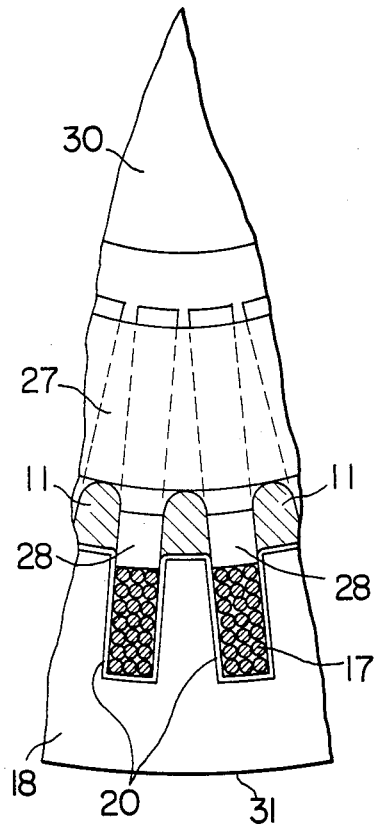
FIG. 8 is an enlarged plan view of part of the apparatus of FIG. 7.

Then, the cylinder 24 operates to push the cam 30 upwardly as shown in FIG. 7, so that the pushers 28 are outwardly radially driven by the cam 30. Consequently, the pushers 28 are projected towards corresponding slots 20 in the stator core 18 so that the coils 17 in the aforementioned spaces are pressed by the pushers 28 into the slots 20 as shown in FIG. 8 and are compressed and shaped by further radial movement of the pushers 28. Although not essential, the compression of the coils 17 is carried out until each coil wire, which originally has a circular cross-section, assumes a non-circular cross-section.

After the insertion of the coils 17 into the slots 20, the cylinder 24 is reversed to lower the cam 30 so that the pushers 28 are allowed to move out of corresponding slots 20 to the original position. Subsequently, the cylinder 13 operates to extract the stripper 26 downwardly from the stator core 18 and then the stator core 18, now receiving the coils, is dismounted or removed from the blades 11. According to the invention, the coils 17 are inserted into the slots 20 in the stator in the manner explained hereinabove.

In the embodiment of the invention described hereinabove, the coil 17 in each slot is compressed until the cross-sectional shape of each coil wire becomes non-circular. Such a deformation of the coil wires, however, is not essential and, in some cases, the coils 17 are merely inserted into the slots 20 without being followed by compression.

An experiment was conducted to examine the relationship between the rate of compression of the coil and the space factor of each slot into which the coil has been inserted by the inserting apparatus of the invention described hereinbefore, the result of which is shown in Table 1 below.

TABLE 1

|   | Compression rate | Space factor |
|---|---|---|
| 1 | 0% | 84% |
| 2 | 6% | 90% |
| 3 | 11% | 95% |

The experiment showed that no damage of the insulation coating on the coil wire is caused by the compression of the coil in the slot 20. Additionally, no cutting of the coil wires was caused due to the uniform distribution of the compression force resulting from the regular arrangement of the coil wires.

As will be apparent seen from the foregoing description, according to the invention, the coils 17 are first placed in the closed spaces each defined by a slot in the stator core 18, blades 11 of an inserting apparatus and a stripper of the apparatus, and are then forced into the slots by the operation of the apparatus. It is, therefore, possible to attain a large value of space factor of 84% or higher which is more than 25% higher than that of the conventionally attained maximum value 67%.

According to the invention, therefore, the stator core of the same thickness can have a reduced size of the slots for receiving a given number coil wires, which, in turn, affords a reduction in the outside diameter of the stator core, contributing to a reduction in the size of the electric motor, as well as to a saving of material. The close contact of the coil wires which are compacted in accordance with the invention can provide a greater heat transfer between adjacent coil wires, so that the heat radiating characteristics of the electric motor can be remarkably increased.

What is claimed is:

1. An apparatus for inserting coils into slots in a stator core of a dynamoelectric machine including a plurality of blades disposed along a circle at a predetermined circumferential pitch so as to be in opposition to ends of teeth separating adjacent slots from each other, a plurality of projections for projecting into spaces formed between adjacent blades, a stripper disposed at a center of the circle of said blades for pushing the coils supported by said blades into corresponding slots of said core and over the upper ends of said blades, at least the portions of said projections disposed in opposition to said slots in said stator core when said stripper is at the end of an upward stroke thereof are constituted by pushers disposed radially around said stripper for sliding movement in a radial direction; and the coil inserting apparatus further including a cam disposed at the center of said stripper in contact with one end of each of said pushers, and means for moving said cam in an upward and downward direction to cause the pusher to radially compress the coils into the slots.

* * * * *